US012688569B2

(12) United States Patent
Faivre et al.

(10) Patent No.: US 12,688,569 B2
(45) Date of Patent: Jul. 21, 2026

(54) METHOD FOR COMPUTING VISIBILITY OF OBJECTS IN A 3D SCENE

(71) Applicant: GADSME, Paris (FR)

(72) Inventors: Jéremy Faivre, Paris (FR); Luc Vauvillier, Vanves (FR); Guillaume Monteux, Paris (FR)

(73) Assignee: GADSME, Paris (FR)

( * ) Notice: Subject to any disclaimer, the term of this patent is extended or adjusted under 35 U.S.C. 154(b) by 109 days.

(21) Appl. No.: 18/433,917

(22) Filed: Feb. 6, 2024

(65) Prior Publication Data

US 2024/0265515 A1 Aug. 8, 2024

(30) Foreign Application Priority Data

Feb. 6, 2023 (FR) ...................................... 2301116

(51) Int. Cl.
*G06T 7/00* (2017.01)
*G06T 7/11* (2017.01)
(Continued)

(52) U.S. Cl.
CPC .............. *G06T 7/0002* (2013.01); *G06T 7/11* (2017.01); *G06T 7/62* (2017.01); *G06T 7/90* (2017.01);
(Continued)

(58) Field of Classification Search
CPC ..... G06T 7/0002; G06T 7/62; G06T 7/11–13; G06T 7/50; G06T 7/90; G06T 7/97;
(Continued)

(56) References Cited

U.S. PATENT DOCUMENTS 6,646,640 B2 * 11/2003 Nagy ...................... G06T 15/60
345/426
6,686,915 B2 * 2/2004 Andrews ............... G06T 15/503
345/422
(Continued)

FOREIGN PATENT DOCUMENTS

FR 3 112 638 A1 1/2022

OTHER PUBLICATIONS

Search Report as issued in French Patent Application No. FR2301116, dated Aug. 25, 2023.
(Continued)

*Primary Examiner* — Wesner Sajous
(74) *Attorney, Agent, or Firm* — CUSHMAN PARTNERS, LLC

(57) ABSTRACT

A method for computing a visibility score of at least one object in a 3d scene, includes the following actions implemented by a dedicated camera clone of a main camera and associated with a dedicated render pipeline: selecting at least one object from the plurality of objects in the scene, associating the object selected with a texture image including only one predetermined colour, rendering, by the dedicated camera, the scene to produce at least one dedicated image, for the object selected, reading, in the dedicated image, the colour at at least one point corresponding to the object in the at least one dedicated image, comparing the colour read with the predetermined colour to obtain the visibility score associated with the object.

16 Claims, 5 Drawing Sheets

(51) Int. Cl.

| | |
|---|---|
| *G06T 7/62* | (2017.01) |
| *G06T 7/90* | (2017.01) |
| *G06T 15/04* | (2011.01) |

(52) U.S. Cl.

CPC .... *G06T 15/04* (2013.01); *G06T 2207/10024* (2013.01)

(58) Field of Classification Search

CPC ....... G06T 15/005; G06T 15/04; G06T 15/10; G06T 15/40; G06T 15/60; G06T 15/205; G06T 15/06; G06T 15/503; G06T 2207/10024; G06T 2210/21; G06T 2210/62; G06T 2210/12; G06T 15/20; G06T 13/20; G06T 19/20; G06T 15/405; G06T 15/506; G06T 15/80; G06T 11/40; G06T 2219/2012; G06V 10/764; A63F 13/52; A63F 2300/66

See application file for complete search history.

(56) References Cited

U.S. PATENT DOCUMENTS

| | | | | |
|---|---|---|---|---|
| 9,501,862 | B2 * | 11/2016 | Nowrouzezahrai | ..... G06T 15/40 |
| 10,242,481 | B2 * | 3/2019 | Gruber | .................. G06T 15/005 |
| 11,260,299 | B2 | 3/2022 | Badichi | |
| 2007/0103462 | A1 * | 5/2007 | Miller | ................... G06T 15/405 |
| | | | | 345/421 |
| 2018/0033191 | A1 * | 2/2018 | Mendez | ................ G06T 15/506 |
| 2020/0273232 | A1 * | 8/2020 | Barré-Brisebois | ...... G06T 15/06 |
| 2023/0281917 | A1 * | 9/2023 | Monteux | .............. G06T 7/0002 |
| | | | | 345/421 |

OTHER PUBLICATIONS

Wolski, K., et al., "Selecting texture resolution using a task-specific visibility metric," Computer Graphics Forum: Journal of the European Association for Computer Graphics, vol. 38, No. 7, Nov. 2019, XP071489866, pp. 685-696.

* cited by examiner

[Fig. 1]
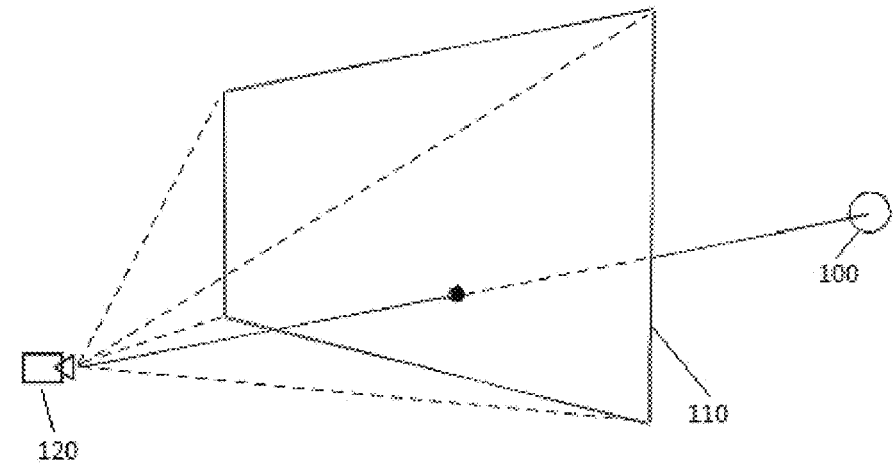
[Fig. 2]
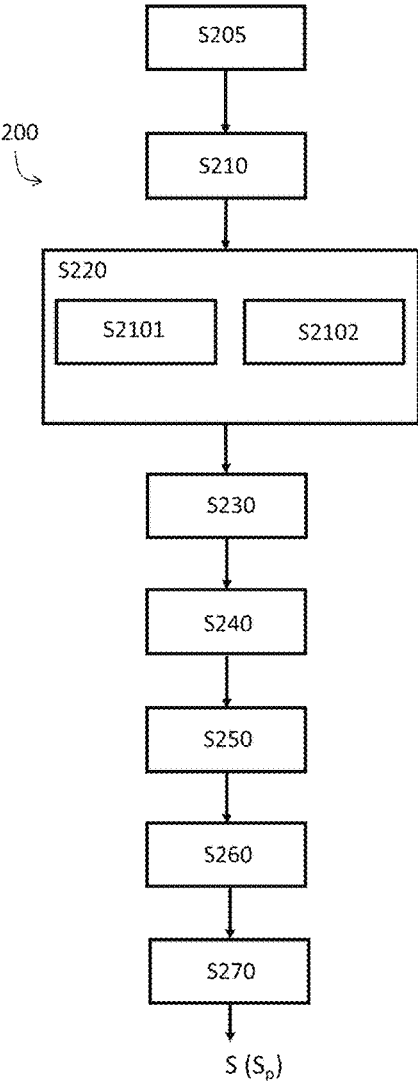

[Fig. 3]
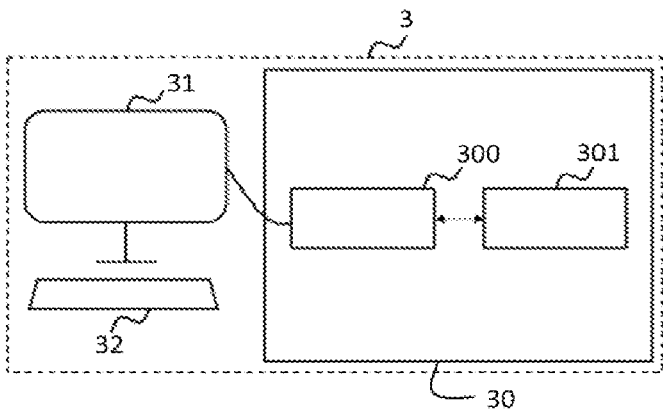
[Fig. 4]
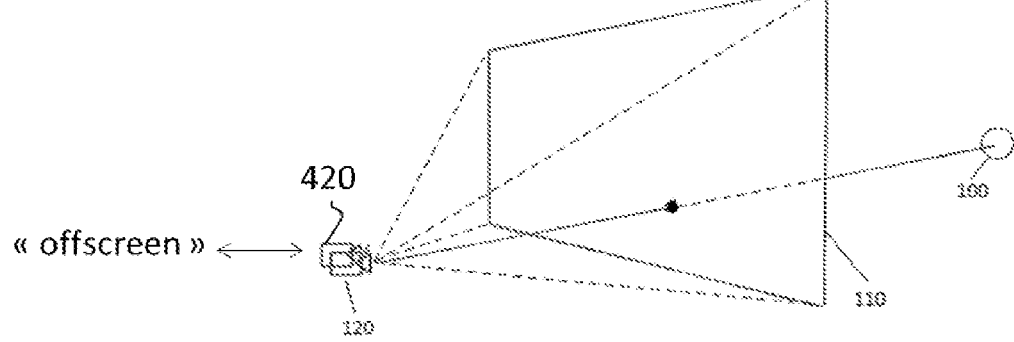
« offscreen »

[Fig. 5]
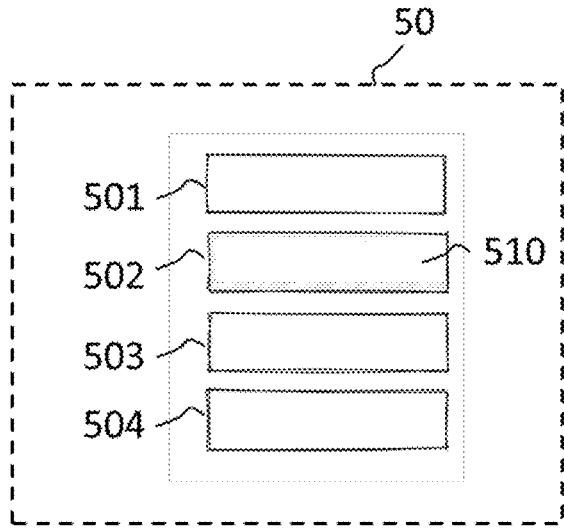
[Fig. 6]
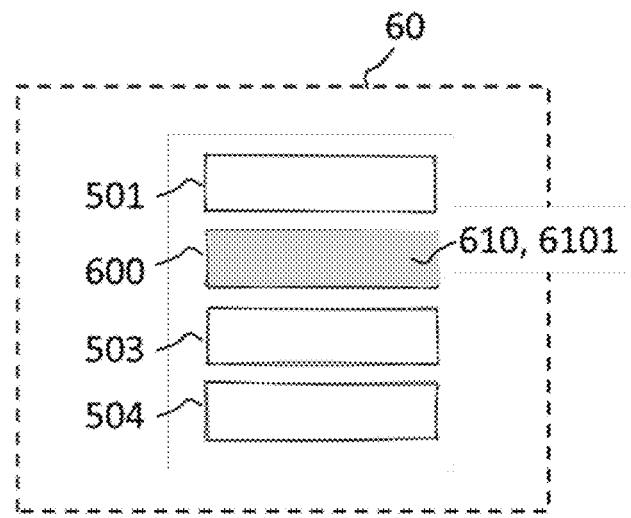

[Fig. 7]
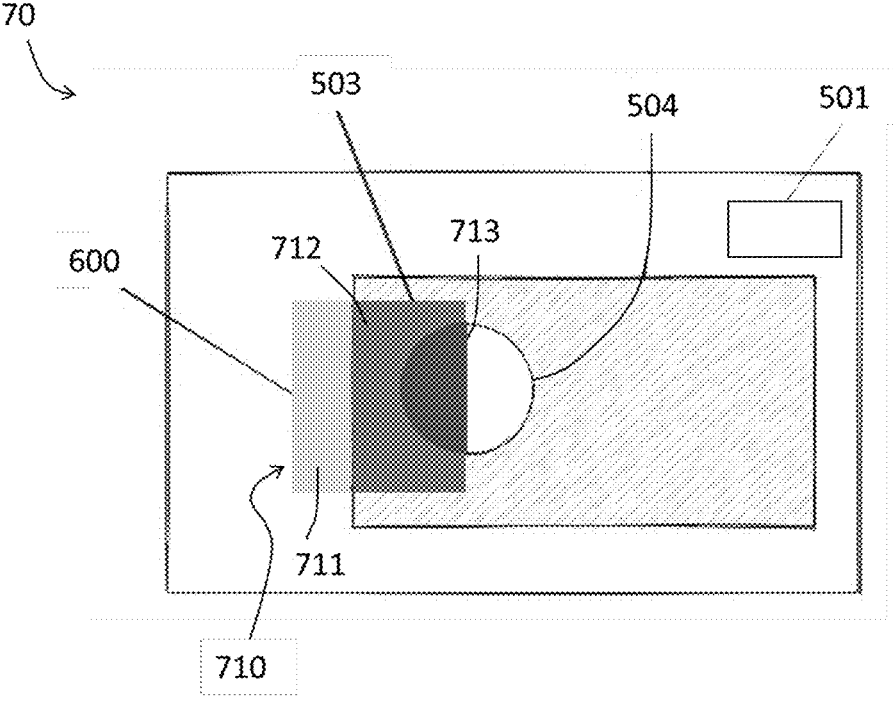
[Fig. 8]
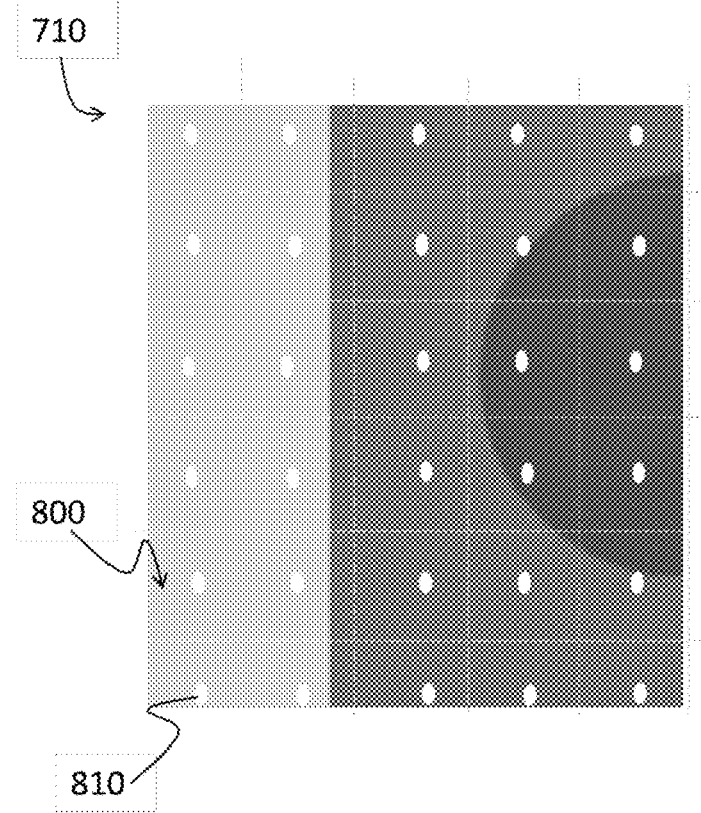

[Fig. 9]
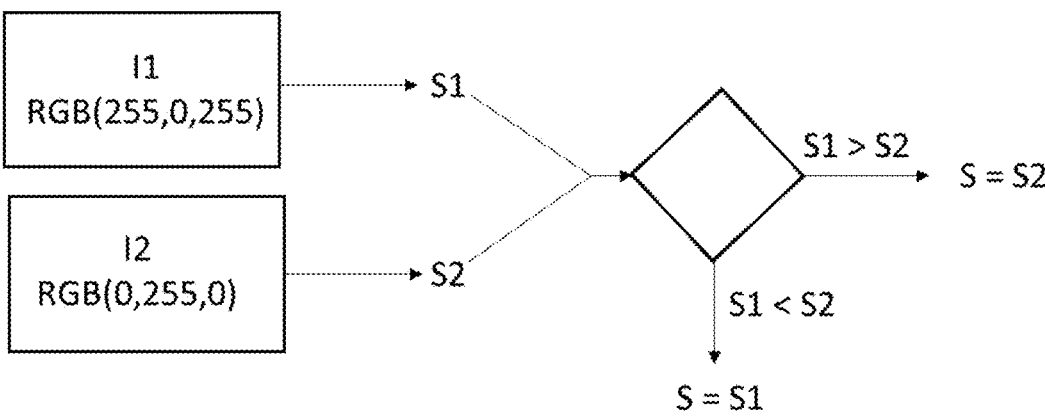

METHOD FOR COMPUTING VISIBILITY OF OBJECTS IN A 3D SCENE

CROSS-REFERENCE TO RELATED APPLICATIONS

This application claims priority to French Patent Application No. 2301116, filed Feb. 6, 2023, the entire content of which is incorporated herein by reference in its entirety.

FIELD

The technical field of the invention is that of three-dimensional rendering or 3D rendering, or 2D rendering for two dimensions, and of object visibility detection in applications using graphics rendering engines, such as video games, virtual worlds, virtual reality, augmented reality, etc.

The present invention relates to a method for computing visibility of objects within a three-dimensional scene, also known as a 3D scene.

BACKGROUND

In the technical field, graphics rendering engines such as Unity, Unreal and others are commonly used to generate and display a video stream giving a virtual representation of a scene comprised of 3D objects in real time.

The images that make up this video stream are two-dimensional images (or matrix images) also known as "renderings".

Each rendering is generated and displayed (also said to be "drawn") on a rendering plane called "viewport" and at a predefined angle of view called "camera". For this, use is made of algorithms combined in a render pipeline used by the graphics rendering engine and integrated on a graphics card.

The render pipeline uses the representation in a coordinate space (x, y, z) of the 3D objects that make up the scene to be represented as input data.

From these input data, and with reference to FIG. 1, each object 100 is projected onto a viewport 110 from the point of view of a camera 120, also defined in coordinate space (x, y, z).

Each rendering reproduces the 3D projection, textures (appearance of the surfaces) and lighting effects (shadows, reflection, etc.) of the object 100.

Objects, as seen by the end user (or viewer) are, for example, everyday objects, buildings, vehicles whose texture and lighting are realistic, that is whose appearance is close to a real appearance.

The camera 120 determines the viewing angle from which the scene is drawn. The position of this camera 120 can change during the video stream. Thus, the point of view used to draw the scene may change from one image to the next. As a result, some objects may be visible in some images, or partially visible, or completely invisible in other images.

For example, an object may be seen (and thus be visible) by the camera 120 when no other object is interposed between the object 100 and the camera 120 and when the object is sufficiently lit. It may be partially visible when a semi-transparent object is interposed between it and the camera, or when it is partially located in a shadow zone. Finally, it may be invisible when it is hidden behind another object, or located in an unlit zone.

Whether an object is visible or not in the scene is therefore not permanent during the video stream. Nor is it easy to determine a priori because the movements of camera 120 are generally not predictable. However, for some applications, there is a need to control and monitor this visibility in real time. For example, knowledge of this visibility enables fine-tuned memory management. If an object is not visible or is no longer visible, the texture associated with that object may not be loaded into or unloaded from memory. Insofar as textures are the elements that take up the most memory space, it is easy to understand the technical interest of such a visibility computation method.

Several solutions exist for this, which consist in representing visibility of an object by a so-called visibility score associated with the object.

A first solution consists in using the zbuffer technique. This technique makes it possible to determine visibility of an object at the time it is drawn. During the generation of the final rendering, other objects can therefore be drawn on top of it, which can mask the object whose visibility has been determined, making the visibility computation incorrect.

A second solution consists in using the "raycast" technique. This technique uses a "collider" or collision detector usually used by the physics engine to detect collisions between objects. The object whose visibility is to be computed must therefore be associated with such a collider. Added to this constraint is the fact that the technique cannot be applied when the object is located behind another object, even a semi-transparent one, or in a shadow zone.

A third solution is described in patent FR3112638B1. It consists in using a stencil buffer in a second rendering intended solely for computing visibility, and therefore not displayed, and generated in parallel with the main rendering (that which renders the scene from a main camera and is displayed to the user), by a second camera which follows the position and characteristics of the main camera at all times. Precisely, the stencil buffer is used in the pipeline serving to generate the second rendering, after a step of drawing the opaque objects in the scene. The render pipeline is necessarily of the "forward" type, that is it allows the opaque objects and the transparent objects in the scene to be drawn in that order.

This technique is very accurate, meaning that it can take account of the lighting and shadows of the scene. For example, it can be used to compute the visibility of an object even if it is partially masked by another object or located in a shadow zone. However, it requires access to a stencil buffer, and therefore to adapted computational resources, and is not compatible with render pipelines other than forward pipelines. For example, it cannot be implemented in a "deferred" type pipeline using a different rendering strategy, wherein the drawing order is different.

There is therefore a need for a method for computing object visibility scores that is adapted to all render pipeline architectures, regardless of whether these architectures are software or hardware. Such a solution should also be able to adapt to the available computational and energy resources.

SUMMARY

An aspect of the invention offers a solution to the problems discussed previously, by making it possible to compute the visibility score not from a second intermediate rendering corresponding to the rendering of opaque objects, but from a second final rendering.

For this, a colour comparison technique is used which is deployed before and after the generation of the second rendering, and which makes it possible to cover cases where the object whose visibility is to be verified has been partially masked by a semi-transparent object, or is rendered hardly visible due to the surrounding light being too weak or too intense, or due to reflections on its surface.

An aspect of the invention thus relates to a method for computing a visibility score of at least one object in a three-dimensional scene, the scene being comprised of a plurality of objects and displayed in a display zone by a main camera associated with a main render pipeline, characterised in that it comprises the following steps implemented by a dedicated camera which is a clone of the main camera and associated with a dedicated render pipeline:

Selecting at least one object from the plurality of objects of the scene,

For the at least one object selected:

Associating the object with a texture image including only one predetermined colour and replacing the texture image of the object associated with the main render pipeline, Rendering, by the dedicated camera, the scene to produce at least one dedicated image, For the at least one object selected, Reading, in the dedicated image, the colour at at least one point corresponding to the object in the at least one dedicated image, Comparing the colour read with the predetermined colour to obtain the visibility score associated with the object, the main and dedicated cameras operating sequentially, so that the dedicated image is produced before or after the scene is displayed in the display zone.

By virtue of an aspect of the invention, a second camera (called the dedicated camera because it is used solely to compute visibility scores), which is a clone of the main camera, makes it possible to reproduce the context of the scene in real time and thus to compute and communicate (for example to a user) visibility scores in real time. The term "real-time" means in synchronisation with the rendering of the scene as displayed to the user in the display zone. For this, the render pipelines are implemented by technical means: processing units, display screen.

The association of a step of assigning, to the object to be tested, a plain texture of predetermined colour (step of associating the object selected with a texture image including only one predetermined colour), a rendering step, and a colour comparison step carried out on the basis of the rendered image, makes it possible to represent the visible, partially visible or non-visible aspect of an object by a visibility score, in an accurate manner (that is as close as possible to what the user sees) and without using a stencil buffer.

The computation accuracy is achieved by virtue of several characteristics.

The fact of exchanging the texture, known as the real texture because it is associated with the main render pipeline, associated with the object selected with a plain texture of predetermined colour makes it possible to provide a robust colour standard compared with the real texture (displayed by the main camera) which generally comprises multiple colours, as well as variations in hue and lighting. The benefit is that even small variations in colour, due for example to the presence of semi-transparent objects or changes in lighting or brightness in the scene, can be detected.

The rendering step carried out successively to the texture exchange step makes it possible to produce (without displaying it) an image (known as a dedicated image) which is identical in every respect to that displayed by the main camera, with the exception of the texture of the object selected, which has taken on the plain texture of the predetermined colour. All the effects of shading effects (shaders), lighting, etc. are identical to the rendering displayed by the main camera. The colour read at at least one point corresponding to the object selected in the dedicated image carries information about these different conditions.

The fact of measuring the colour difference at one or more points of the dedicated image corresponding to points positioned on the object makes it possible to increase the signal-to-noise ratio of the final visibility score (by averaging measurements), and/or to obtain a visibility map of the object.

It should be noted that the fact that the two, main and dedicated, cameras operate sequentially makes it possible to carry out the step of assigning the plain texture image before rendering of the dedicated camera.

Thus, the method according to an aspect of the invention makes it possible to precisely represent the state of visibility of some objects in a 3D scene in real time, over a wide range of rendering configurations and pipelines. It is simpler to implement than the prior art technique based on the stencil buffer.

According to an embodiment, the visibility score is computed by taking the lowest visibility score among a first visibility score computed during a first iteration of the dedicated camera, and a second visibility score computed during a second iteration of the dedicated camera, the first and second iterations being successive, the predetermined colour chosen for the second iteration being opposite to the predetermined colour chosen for the first iteration on the hue circle.

This embodiment makes it possible to avoid false positives (i.e. an object detected as visible when it is not) and therefore to improve accuracy of the method.

This embodiment makes it possible especially to compute the visibility score accurately even when the scene has a colour texture close to the predetermined colour, or/and when an object with a colour texture close to the predetermined colour hides or partially covers the object whose visibility is desired to be measured.

Further to the characteristics just discussed in the previous paragraph, the method according to an aspect of the invention may have one or more complementary characteristics from among the following, considered individually or according to any technically possible combinations.

The predetermined colour is chosen from a list consisting of at least: pink with red, green and blue components equal to 255, 0 and 255 respectively, and green with red, green and blue components equal to 0, 255 and 0 respectively.

Pink is beneficially chosen because it is a colour that is generally not very present in the scene. This choice of predetermined colour therefore reduces the probability of finding an object of the same colour as the predetermined colour interposed between the object selected and the camera. As this configuration can lead to visibility detection errors (the small colour difference then found at the end of the comparison step indicating abnormal visibility of the object selected), the choice of pink is favourable to a more reliable measurement of the visibility score.

Reading, in the dedicated image, the colour of the object selected is carried out on a plurality of points corresponding to the object selected in the at least one dedicated image, for example 16 points, the points of the plurality of points being obtained by cutting the object selected into zones to be tested, and by taking the central points of the zones to be tested.

Thus, it is possible to determine a visibility score at different locations on the object. The benefit is that it is thus possible to take account of the fact that an object partially covers the object to be tested, or that part of the object is in a shadow zone.

According to the size of the object selected (which also depends on the resolution of the dedicated image), the points of the plurality of points may overlap each other. In this case, the visibility score is computed several times for a same point, and the final visibility score is the average of the visibility scores computed.

Comparing the colour read with the predetermined colour is obtained by computing a colour difference by:

computing, for each red, green and blue component, the absolute difference between the colour read and the predetermined colour, and computing the average of the absolute differences computed.

Comparing the colour read with the predetermined colour is further based on a hue difference computation comprising the following steps of:

Determining, from the red, green and blue components, the hue of the colour read and the hue of the predetermined colour, computing the difference between the hue read and the hue of the predetermined colour, weighting the result of the computed difference between the hue read and the hue of the predetermined colour to obtain the hue difference, comparing the hue difference with a predetermined threshold value such as the value 0.25:

If the hue difference is less than or equal to the threshold value, the difference between the colour read and the predetermined colour is equal to the average of the hue difference and the colour difference, If the hue difference is greater than the threshold value, the difference between the colour read and the predetermined colour is equal to the colour difference.

Thus, the method is more resilient to changes in the brightness of the scene. Indeed, the hue difference measurement makes it possible to determine whether two colours are similar, even if their brightness is different (one is light, the other dark). The benefit is that the visibility score is determined accurately even if the object selected has been masked by a semi-transparent object, or/and if the surrounding light in the scene is too intense or too weak and makes the object selected hardly visible, or/and if the object selected is subject to a reflection that prevents its surface from being clearly seen.

The image production frequency of the dedicated camera is lower than the computation frequency of the main camera.

The image production frequency of the dedicated camera is less than or equal to a quarter of the image production frequency of the main camera.

Thus, the computational resources required are limited and the performance of the application using the rendering engine is not degraded.

The resolution of the dedicated image is lower than the rendering resolution of the main camera.

As with the reduction in frequency, the fact of reducing the resolution of the dedicated image means that the performance of the application is not degraded, while at the same time allowing tracking of visibility in real time.

The smallest resolution of the dedicated image corresponds to an image width of 96 pixels.

This value, although low, has been identified as providing a visibility score that combines accuracy and efficiency and does not impact the operation of the application.

The method further includes, after the colour comparison step, an additional step, performed for the at least one object selected, of associating the object with the texture image associated with the main render pipeline, referred to as the real texture image, and replacing the texture image only including the predetermined colour.

The method further comprises a step of testing the size of the object selected, comprising determining a surface area occupied by the object selected on the dedicated image, and a surface area ratio between the surface area occupied by the object and the surface area of the dedicated image, if this ratio is less than a threshold value, for example a threshold value equal to 1.5%, then the visibility score is equal to 0, the object selected being considered to be too small to be visible.

Further to the characteristics just discussed in the previous paragraphs, the method may have one or more additional characteristics from among the following, considered individually or according to any technically possible combinations:

The method may further comprise a step of determining compliance, for a user, with visibility conditions of the at least one object, the visibility conditions depending on the visibility score of the at least one object.

The visibility conditions may then further depend on predetermined parameters including a minimum duration of visibility of the at least one object and/or a surface area ratio between a surface area occupied by the object and the surface area of the dedicated image and/or an angle between the direction normal to the surface area occupied by the object and the normal direction of the display zone.

After the step of determining compliance with the visibility conditions, the method may comprise a step comprising modifying the scene and/or a triggering an additional event inside or outside the scene.

Alternatively to the step of determining compliance, for a user, with the visibility conditions of the at least one object, the method may further comprise, when the visibility score of the at least one object is different from a predetermined visibility score, a step of modifying the object and reiterating the steps of computing the visibility score of the object modified.

The invention and its different applications will be better understood upon reading the following description and upon examining the accompanying figures.

BRIEF DESCRIPTION OF THE FIGURES

The figures are set forth by way of indicating and in no way limiting purposes of the invention.

FIG. 1 shows a simplified illustration of the operation of a graphics rendering engine, FIG. 2 is a synoptic diagram illustrating the sequence of steps in the computation method according to an embodiment of the invention, FIG. 3 shows schematically an embodiment of a computer, FIG. 4 shows a simplified illustration of the operation of the graphics rendering engine used to implement the steps of FIG. 2, FIG. 5 is an illustration of a 3D scene which will be rendered, during its next iteration, by the main camera of the graphics rendering engine of FIG. 4, FIG. 6 is a simplified illustration of the 3D scene of FIG. 5 obtained at the end of the third step of FIG. 2, FIG. 7 is a simplified illustration of the rendering, by the dedicated camera of the graphics engine of FIG. 4, of the 3D scene of FIG. 5, FIG. 8 is an enlarged view of FIG. 7, FIG. 9 illustrates an embodiment of the method of FIG. 2.

DETAILED DESCRIPTION

Unless otherwise specified, a same element appearing in different figures has a single reference.

One or more aspects of the invention relate to a method for computing a visibility score associated with an object in a 3D virtual scene, in particular a computation method that combines efficiency, accuracy and ease of implementation.

FIG. 2 illustrates schematically the sequence of steps S205, S210, S220, S230, S240, S250, S260 and S270 of the computation method 200 according to an embodiment of the invention.

In practice, and with reference to FIG. 3, the method 200 is implemented by a system 3 comprising a computer 30, a game console, a smart phone and more generally any device capable of implementing a graphics rendering engine.

In this description, the processing actions are carried out by processing units, that is microprocessors 300 which use memory 301. These microprocessors are general-purpose microprocessors also called CPUs, and/or graphics microprocessors also called GPUs. For example, the memory 301 may include instructions executed by one or more microprocessors 300 to carry out the processing actions disclosed herein.

The system 3 may comprise a screen 31 and/or a keyboard 32.

The steps of the method 200 are described below with reference to FIG. 2, FIG. 4, FIG. 5, FIG. 6, FIG. 7 and FIG. 8.

The method begins with a step S205 of declaring a dedicated camera 420 (see FIG. 4) which is added to a main camera 120. Programming interfaces of the rendering engine are used to declare and instantiate this dedicated camera 420.

In the remainder of the description, the term "camera" refers to the (virtual) viewpoint from which the scene is rendered. The expression "the camera is drawn" refers to the fact of generating (or rendering), from a 3D scene, a 2D image from the camera's point of view. For this, the camera is associated with a render pipeline implemented by the processing units.

The render pipeline consists of a sequence of algorithmic bricks designed to pixelise the geometric objects of the 3D scene in order to obtain the 2D image.

Finally, "camera frequency" refers to the number of 2D images per second generated by the camera, which corresponds to the number of camera iterations per second as well.

FIG. 5 schematically represents the 3D scene 50 drawn and displayed in a display zone by the main camera 120 and in which it is desired to verify visibility of one or more objects. This scene 50 is comprised of a plurality of 3D objects 501, 502, 503, 504, each object having an identifier. The objects are defined by a list of geometric shapes and attributes (texture, etc.).

The main camera 120 is associated with a main render pipeline.

The main camera 120 generates and displays to the user of the application a series of successive images over a display zone (for example occupying all or part of the screen

32 illustrated in FIG. 3). The time between two images in the series of images depends on the frequency of the main camera 120. The latter is adapted to human vision, to give the fluidity required for real-time viewing of the scene. As a minimum, the image production frequency of the main camera 120 is 30 images per second. In an embodiment, the frequency of the main camera 120 is 60 images per second. It may be 120 images per second as well.

The dedicated camera 420 is a clone of the main camera 120, that is it tracks at all times the position and characteristics of this main camera 120 (position, scale, filter options, cutting planes, etc.). For example, it reproduces the effects of shadows, lighting, etc. identically to the main camera 120.

The dedicated camera 420 differs from camera 120 in several respects.

Firstly, the dedicated camera 420 is associated with a dedicated render pipeline, modified with respect to the main render pipeline in order to integrate algorithms for implementing steps S210 to S270 of the method 200.

Secondly, the dedicated camera 420 renders a so-called dedicated image, in an "off-screen" manner. This means that this dedicated image is not displayed on screen 31. The dedicated image is therefore not intended for the user of the application (unlike the main rendering displayed by the main camera 120), but solely for computing the visibility score.

Thirdly, the image production frequency of the dedicated camera 420 may be lower than the frequency of the main camera 120.

The image production frequency of the dedicated camera may thus be less than or equal to a quarter of the image production frequency of the main camera.

Fourthly, the resolution of the dedicated image rendered by the camera 420 can be degraded, that is lower than the resolution of the main rendering. The resolution is defined, for example, by the size of the dedicated image. In an embodiment, the smallest dimension of the dedicated image is 96 pixels, the largest dimension being computed with respect to the dimensions of the screen 31.

Reducing the frequency and resolution of the dedicated camera 420 ensures that the performance of the graphics engine is not adversely affected.

Finally, it should be noted that the dedicated camera 420 and the main camera 120 operate sequentially. Stated differently, one of the two cameras 120, 420 is drawn before the other. The rendering of the dedicated image is thus triggered with a slight time lag, for example a time lag of 33 ms, with respect to the rendering and display of the scene image in the main window.

Once the dedicated camera 420 is declared in step S205, steps S210, S220, S230, S240, S250 and, optionally, steps S260 and S270 are successively performed, at each iteration of the dedicated camera 420.

Step S210 of the method 200 is performed from the 3D scene 50 described previously in connection with FIG. 5. This scene is the one that will be displayed by the main camera 120 during its next iteration.

Step S210 is a step of selecting one or more objects 600 from the plurality of objects 501, 502, 503, 504 in the 3D scene 50. In the example given, one object 600 is selected, corresponding to object 502 of scene 50.

The objects 600 selected are those whose visibility is desired to be measured in real time, via a visibility score computation.

The selection step S210 produces, in the memory zone 301 of the system 3 implementing the method 200 according to the invention, a list of identifiers associated with each object 600 selected, this list comprising the geometry of the object and its texture. The texture of the object 600 selected is typically an image, referred to as a texture image. In this step, the texture 510 of the object 600 is the one displayed to the user. It will be referred to as the "real texture 510", or "real texture image 510" of the object 600 selected.

Step S210 is followed by a step S220 which consists in exchanging the real texture image 510 of the object 600 selected with a texture image including only one predetermined colour.

For this, during a sub-step S2201 of step S220, the object 600 selected (or each object selected) is associated with a texture image 610 that only includes a single predetermined colour 6101. It is further possible, in a sub-step S2202 which may take place before or after the association step S220-S2201, to extract and save in memory the real texture image 510 of the object 600 selected (or of each object selected). The term "save" refers to saving by reference of the texture image, and not to a copy, in memory, of the texture image.

Thus, at the end of step S220, and with reference to FIG. 6, a so-called initial scene 60 is obtained, identical to the 3D scene 50 which will be displayed by the main camera 120, with the exception of the objects 600 selected which will have taken on a plain texture 610, of a predetermined colour 6101. All the other attributes (or settings and effects) of these objects 600 selected are retained, for example light, shading, shaders, etc.

By plain texture, it is meant that a single predetermined colour 6101 is used for a single object 600.

In an embodiment, the predetermined colour 6101 is a colour that is generally not very present in a 3D scene, such as pink, with a red component equal to 255, a green component equal to 0 and a blue component equal to 255 (or RGB (255, 0, 255)).

When multiple objects are selected, the same predetermined colour 6101 or different predetermined colours can be used.

Step S220 is followed by a step S230 of generating, by the dedicated camera, a dedicated image of the real scene 60 obtained at the end of step S220.

FIG. 7 shows an example of a dedicated rendering 70 of the real scene 60 including the objects 501, 503, and 504 and the object 600 selected.

The object 600 selected is in the background.

The first object 501 is at a distance from the object 600 selected and has no influence thereon.

The second object 503 is in an intermediate plane and partially overlaps the object 600 selected.

The third object 504 is in the foreground. Furthermore, this third object 504 is transparent, covers the second object 503, and partially covers the object 600 selected.

The object 600 selected has taken on a new colour 710, which depends on the scene and the predetermined colour 610 assigned in the previous step S220.

The new colour 710 actually results from a modification of the plain texture 610 due to the presence of objects in planes between the plane of the object selected and the camera 420, or due to the presence of shadow zones covering the object 600 selected.

In the example of the dedicated image 70 illustrated in FIG. 7, the colour 710:

has not been modified with respect to the predetermined colour 6101 in the zone 711 where the object 600 selected has not been covered,
  has been modified with respect to the predetermined colour 6101 with some amplitude in zone 712 where the object 600 selected is covered with the third transparent object 504, has been modified in zone 713, with a greater amplitude than in zone 712, where the object 600 selected is covered with the second object 502.

Thus, the more the object 600 selected is visible (not covered, as in zone 711), the smaller the colour difference between the colour 710 in the dedicated image and the predetermined colour 6101.

Conversely, the less the object 600 selected is visible (covered with several objects, as in zone 713), the greater the colour difference between the colour 710 in the dedicated image and the predetermined colour 6101.

The colour difference between the colour 710 in the dedicated image (70) and the predetermined colour texture 6101 is therefore correlated to the state of visibility or invisibility of the object 600 selected: the greater the difference, the less visible the object, and, conversely, the smaller the difference, the more visible the object.

The dedicated image 70 is therefore a rendering essentially identical to the main rendering that will be generated during the next iteration of the main camera 120. One difference is the object or objects 600 selected will have taken on a new colour 710. Another difference may be, depending on a parameter setting of the implementation of the invention, the resolution of the dedicated image 70.

In other words, it is the same scene that is rendered on the dedicated image 70 and on the image displayed by the main camera 120, but for some objects corresponding to the objects 600 selected, the real textures 510 are changed for plain textures 610, of the predetermined colour 6101, for rendering by the dedicated camera 420, but remain used by the main camera 120.

Steps S240 and S250 following step S230 aim to measure this colour difference and represent it by a visibility score.

Step S240 is carried out from the dedicated image 70. It consists in reading the colour 710 of the object 600.

This step S240 can be implemented by adding a "compute shader" in the dedicated pipeline, at the end of rendering, by the dedicated camera 420.

With reference to FIG. 8, the colour 710 of the object 600 selected is read at at least one point 810 belonging to the object 600.

In an embodiment, the colour 710 is successively read at each point of a plurality of points belonging to the object, these points being determined by a prior step (not represented in FIG. 2) of cutting the object into zones to be tested, and determining a central point in each zone to be tested.

The number of points is, for example, 16. A point corresponds to a pixel.

According to the resolution chosen for the dedicated image, points 810 may be superimposed to each other. In this case, colour reading is performed several times at a same point.

This is the case, for example, when the resolution of the dedicated image 70 is minimal (96 pixels for the smallest dimension of the dedicated image). The size of the object selected in the image may then only occupy a few pixels.

Step S250 follows step S240. It consists in comparing the colour 710 obtained on the dedicated image 70 and the predetermined colour 6101 at each measurement point 810.

The result of this colour comparison is beneficially between 0 (identical or very close colours) and 1 (opposite or very distant colours).

Two computation techniques can be performed to compare colours.

The first technique consists in measuring a colour difference by computing, for each red, green and blue component, the absolute difference between the colour 710 read and the predetermined colour 6101, and then averaging these absolute differences computed.

The second technique consists in associating a hue comparison with the colour difference measurement. The hue comparison makes it possible to detect that one colour is identical to another, even if the lighting is different. Thus, the comparison is more accurate and more robust to changes in scene brightness.

More precisely, the second technique comprises the following steps of:

Determining, from the red, green and blue components, the hue of the colour 710 read and the hue of the predetermined colour 6101, Computing the difference between the hue read and the hue of the predetermined colour, Weighting the result of the computed difference between the hue read and the hue of the predetermined colour, the result of the weighting being between 0 and 1 and determining the hue difference.

Comparing the hue difference with a predetermined threshold value, such as 0.25:

If the hue difference is less than or equal to the threshold value, the difference between the colour read and the predetermined colour is equal to the average of the hue difference and the colour difference, If the hue difference is greater than the threshold value, the difference between the colour read and the predetermined colour is equal to the colour difference.

The final result is a value between 0 (close or identical colours) and 1 (opposite or distant colours).

A partial visibility score Sp is then determined from the final result, this partial visibility score being between 0 (test zone 800 not visible) and 1 (test zone 800 visible).

A partial visibility score Sp is therefore obtained for each test point 810 (i.e. each test zone 800).

The "final" visibility score S of the object 600 selected can then be determined by computing the average of all the partial visibility scores Sp obtained in step S250, this final score S being between 0 (non-visible object) and 1 (visible object) as well.

It should be noted that the partial visibility scores Sp are used to verify visibility of the object 600 selected in the following cases:

Object 600 has been partially masked by a semi-transparent object,

The surrounding light in the scene is too intense or too weak, making the object hardly visible, The object is reflected in such a way that its surface cannot be seen clearly.

The visible/non-visible state can be determined from the final visibility score S of object 600 and a threshold value.

The final visibility score S and/or the partial visibility scores Sp are then communicated, via a communication system (not represented) to the user of the application or to other users.

When the real texture image 510 is saved during step S220, step S250 may be followed by a step S260 consisting in exchanging, in the initial scene 60, the plain texture image 610 of the predetermined colour 6101 with the real texture image 510.

For this, the texture image 510 extracted and saved during step S220 is associated with each object 600 selected.

Since the main camera 120 and the dedicated camera 420 operate sequentially, the rendering of the main camera 120 takes place before or after that of the dedicated camera 420, that is before having replaced (step S220) the real texture image 510 with the plain texture image 610, or after having restored (step S260) the real texture image 510 while the plain texture image 610 was being used for rendering 70 by the dedicated camera 420.

In other words, the fact that the rendering of the two main and dedicated cameras 120, 420 is never performed simultaneously makes it possible to always use the real texture image 510 for the main camera 120, and the plain texture image 610 for the dedicated camera 420.

A step S270 can also be performed following step S260, which consists in adding a visibility criterion related to the size of the object 600 selected in the scene 50. This step S270 aims to indicate as being not visible any object 600 whose size is too small compared to the size of the display zone. This may be because the object is located at a great distance from the camera 120.

For this, step S270 consists in determining a surface area occupied by the object 600 selected on the dedicated image 70, and a surface area ratio between the surface area occupied by the object determined previously, and the surface area of the dedicated image 70, if this ratio is less than a threshold value, for example 1.5%, then the visibility score is equal to 0, the object selected being considered too small to be visible.

An embodiment of the method 200 is described below in connection with FIG. 9.

In this embodiment, the visibility score S is computed by taking the lowest visibility score among a first visibility score S1 computed during a first iteration I1 of the dedicated camera 240, and a second visibility score S2 computed during a second iteration I2 of the dedicated camera 240.

The first and second iteration I1, I2 are successive iterations.

The predetermined colour chosen for the second iteration I2 is opposite to the predetermined colour chosen for the first iteration on the hue circle. For example, if pink RGB (255, 0, 255) is chosen for the first iteration I1, then green RGB (0, 255, 0) will be chosen for the second iteration I2.

This embodiment has the effect of eliminating false positives.

To explain this, let us take the example of a scene that is essentially pink in colour. If a predetermined colour that is also pink is used, then the object 600 selected will be abnormally detected as visible during a single iteration, even if it is hidden behind another object in the scene. This is because the colours are close.

Similarly, if the object 600 to be tested is hidden behind another pink-coloured object, it will obtain an abnormally high visibility score S1 with a first iteration I1 using a pink-coloured texture.

By using a second colour opposite to pink during the next iteration, for example green (with red, green and blue components equal to 0, 255 and 0 respectively), the object 600 will be detected with a much lower visibility score S2, due to the difference between the pink (of the scene or of the object hiding the object to be tested) and the green (of the object 600 to be tested). By using this second visibility score S2, the object is properly detected as not being visible or hardly visible, and a false positive is avoided.

Conversely, if the object to be tested is hidden by another green object, the first iteration will give a low score which corresponds to the real visibility of the object to be tested in the scene.

It will also be noted that it is not possible to obtain false negatives.

Thus, the method 200 according to the invention makes it possible to track visibility of an object in a 3D virtual scene in real time, using a visibility score associated with the object, combining accuracy and efficiency over a wide range of configurations and rendering pipelines, while being simpler to implement than the stencil buffer technique described in patent FR3112638B1.

The method 200, by making it possible to track visibility in real time, by one or more users, of an object in a 3D virtual scene, can be used in any field of application using a 3D virtual scene, such as video games, virtual reality and augmented reality.

The visibility score thus makes it possible, for example, to evaluate whether an object, containing for example information of interest, has been seen by the user or users. This object of interest may for example, be used to display marketing information, but also educational information or information relating to safety rules.

The method 200 can thus include an optional step for determining whether a user has, at least partially, seen the object on the basis of the visibility score computed for this object. The verb "to see" in the expression "whether or not the user has seen the object" is understood here to mean visual perception, that is the user has actually perceived the object. In other words, the method may comprise an optional step of determining that visibility conditions of that object are met (for a user), where the visibility conditions depend on the visibility score computed for the object and on at least one predetermined visibility score.

The visibility conditions may further depend on predetermined parameters including a minimum visibility duration of the at least one object and/or a surface area ratio between a surface area occupied by the object and the surface area of the dedicated image and/or an angle between the direction normal to the surface area occupied by the object and the normal direction of the display zone. The minimum visibility time typically corresponds to the minimum time required for the user to perceive presence of the object in the scene and to perceive its information content. For example, the visibility conditions are said to be met when the visibility score, for example the final visibility score S, computed for a given object is equal to 1 for a duration greater than 2 s.

The method 200 may then comprise, upon determining whether or not the visibility conditions are met, a step of modifying the scene.

Thus, when the visibility score of an object is less than a first predetermined visibility score, an optional final step of modifying the virtual environment may be performed. For example, the same object may be duplicated and/or displaced in the three-dimensional scene as long as the visibility score of the object is lower than the first predetermined visibility score. In this case, the displacement may be performed in a specific place in the three-dimensional scene for which the probability of the object being seen is high.

In a complementary and/or alternative manner, when the visibility score of an object is greater than a second predetermined visibility score, the object may be removed and/or displaced in the three-dimensional scene. In this case the displacement can be made in a specific place in the three-dimensional scene for which the probability of the object being seen is low. The method therefore optimises the three-dimensional scene to ensure that information of interest has been seen by the user.

The optimisation further saves memory and computational resources since, if an object has already been seen, it can, for example, be deleted and/or moved so that it is no longer displayed. Further, the display of the object can be modified. Indeed, by virtue of the visibility score thus computed, the texture associated with an object that is not visible may not be loaded into, or unloaded from, the memory.

In a first example of application, the method can be used to evaluate the effectiveness of vocational training when it is used within the scope of vocational training programmes using, for example, virtual reality and/or augmented reality. Indeed, by virtue of the visibility score, it is possible to objectively assess where and how, that is on which objects, learners are focusing their attention. This evaluation can be used, for example, to improve teaching methods and/or to evaluate learners.

For example, the visibility score can be used to analyse a learner's behaviour and to understand how different types of learners, for example of different levels, focus their attention on different aspects of the vocational training programme.

In a second example of application, the method may identify objects, for example representing products for sale, that have aroused the most interest from the user or users. The method may then comprise, when implemented on several objects in the scene, an optional step comprising the following operations:

ordering the visibility scores computed for each object in the scene, and determining the object with the highest visibility score.

This optional step may further be followed by a step comprising modifying the layout of one or more of the objects as a function of the ordering of their visibility score. Thus, by virtue of the visibility score, it is possible to optimise, for example by customising, the layout and appearance of one or more products represented in the 3D virtual scene by one or more objects. Finally, it is also possible to carry out market research and product testing by analysing the visibility score of different objects placed in the 3D virtual scene.

In a third example of application, the method can make it possible to measure effectiveness of one or more characteristics of an object so that this object arouses interest on the part of one or more users. For example, the object may be used to advertise safety information or an object for sale.

Stated differently, the visibility score can be used to test several alternatives for an object. The visibility scores of these alternatives can then be compared and the alternative with the best visibility score retained, according to a test method known as "A/B testing". In practice, the method 200 may thus further include a step of using the visibility score of the at least one object, comprising:

When the visibility score of the at least one object is different from a predetermined visibility score, modifying the object and reiterating the computation of the visibility score for the object modified.

By modifying the object, it is meant modifying the information of interest associated with the object or of the display of the object, or modifying its location in the scene. This step of using the visibility score makes it possible to reallocate advertising content, for example on the fly, to several locations in the scene in order to maximise its visibility. It also makes it possible to use the visibility score to compare different alternatives (or versions) of a same object.

In a fourth example of application, the method may allow an additional event to be triggered when the visibility score is less than or greater than a predetermined visibility score. This event may for example, be the creation of an additional object or visual and/or haptic feedback and/or sound. This event may for example, enable attention to be drawn to the object so that its visibility score increases. This event can also be used to transmit other information. For example, the event may consist of displaying additional advertising content in the form of audio advertising content and/or an immersive and/or interactive element only when the user maintains a viewing angle for a time greater than a predetermined time.

In a fifth example of application, the method may enable optimisation of a user interface and a user experience. For example, the visibility score can be used to analyse which parts of the user interface attract the most attention from players in order to improve design of the user interface and the user experience. For example, the visibility score can be used to determine which buttons or functions are most and/or least observed by the user.

In a sixth example of application, the method may allow the difficulty level of a video game or training to be adapted to the level of the user. For example, it is possible, with the visibility score of the key elements of a level, to ensure that these key elements are neither too visible nor too difficult to find.

In a seventh example of application, the method can be used to improve tutorials. In particular, the method can track visibility of instructions or hints given during tutorials to determine whether they are easily noticed and understood by users.

In an eighth example of application, the method may identify abnormal user behaviour. For example, a user whose behaviour ignores an object whose visibility score is above a threshold visibility score or conversely a user who, like a gamer, spots opponents through walls in a shooting game.

In a ninth example of application, the method may allow the improvement of the behaviour of different characters of the 3D virtual scene controlled by artificial intelligence. For example, by virtue of the visibility score, it is possible to adapt the behaviour of artificial intelligence of a character of interest as a function of the visibility of the character. This therefore results in more realistic characters that are harder to predict.

It will be appreciated that the various embodiments and aspects of the inventions described previously are combinable according to any technically permissible combinations. For example, various aspects of the present disclosure may be used alone, in combination, or in a variety of arrangements not specifically described in the embodiments described in the foregoing and is therefore not limited in its application to the details and arrangement of components set forth in the foregoing description or illustrated in the drawings. For example, aspects described in one embodiment may be combined in any manner with aspects described in other embodiments.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified.

The invention claimed is:

1. A method for computing a visibility score of at least one object in a three-dimensional scene, the scene being comprised of a plurality of objects and displayed in a display zone by a main camera associated with a main render pipeline, the method comprising the following steps implemented by a dedicated camera which is a clone of the main camera and associated with a dedicated render pipeline:
    selecting at least one object from the plurality of objects of the scene, the at least one object selected being rendered in a real texture image associated with the main render pipeline,
    for the at least one object selected:
        associating the object with a plain texture image including only one predetermined colour, replacing the real texture image by the plain texture image,
    rendering, by the dedicated camera, the scene to produce at least one dedicated image,
    for the at least one object selected,
        reading, in the dedicated image, the colour at at least one point corresponding to the object selected in the at least one dedicated image,
        comparing the colour read with the predetermined colour to obtain the visibility score of the object selected,
the main and dedicated cameras operating sequentially, so that the dedicated image is produced before or after the scene is displayed in the display zone.

2. The method according to claim 1, wherein the visibility score is computed by taking the lowest visibility score from a first visibility score computed during a first iteration of the dedicated camera, and a second visibility score computed during a second iteration of the dedicated camera, the first and second iterations being successive, the predetermined colour chosen for the second iteration being opposite on a hue circle to the predetermined colour chosen for the first iteration, the chosen predetermined colour for the second iteration being determined by subtracting a set of RGB values of the predetermined colour chosen for the first iteration from 255, the first iteration and the second iteration of the dedicated camera comprising the following steps of selecting at least one object, associating the object for the at least one object selected, rendering the scene for the at least one object selected, reading the colour and comparing the colour read for the at least one object selected.

3. The method according to claim 1, wherein the predetermined colour is chosen from a list formed by at least: pink with red, green and blue components respectively equal to 255, 0 and 255, and green with red, green and blue components respectively equal to 0, 255 and 0.

4. The method according to claim 1, wherein reading, in the dedicated image, the colour of the object selected is performed on a plurality of points corresponding to the object selected in the at least one dedicated image, the plurality of points being obtained by cutting the object selected into zones to be tested, and taking the central points of the zones to be tested.

5. The method according to claim 4, wherein the plurality of points is 16 points.

6. The method according to claim 1, wherein comparing the colour read with the predetermined colour is obtained by computing a colour difference by:
    computing, for each red, green and blue component, the absolute difference between the colour read and the predetermined colour, and
    computing the average of the absolute differences computed.

7. The method according to claim 6, wherein the comparison of the colour read with the predetermined colour is further based on a hue difference computation comprising the following steps of:

determining, from the red, green and blue components, the hue of the colour read and the hue of the predetermined colour, computing the difference between the hue read and the hue of the predetermined colour, weighting the result of the computed difference between the hue read and the hue of the predetermined colour to obtain the hue difference, comparing the hue difference with a predetermined threshold value such as the value 0.25:

if the hue difference is less than or equal to the threshold value, the difference between the colour read and the predetermined colour is equal to the average of the hue difference and the colour difference, if the hue difference is greater than the threshold value, the difference between the colour read and the predetermined colour is equal to the colour difference.

8. The method according to claim 1, wherein the image production frequency of the dedicated camera is less than or equal to a quarter of the image production frequency of the main camera.

9. The method according to claim 1, wherein the resolution of the dedicated image is less than the render resolution of the main camera.

10. The method according to claim 9, wherein the smallest resolution of the dedicated image corresponds to an image width of 96 pixels.

11. The method according to claim 1, further comprising a step of testing the size of the object selected, comprising determining a surface area occupied by the object selected on the dedicated image, and a surface area ratio between said surface area occupied by the object and the surface area of the dedicated image, if said ratio is less than a threshold value, then the visibility score is equal to 0, the object selected being considered too small to be visible.

12. The method according to claim 11, wherein the threshold value is equal to 1.5%.

13. The method according to claim 1, further comprising a step of determining compliance, for a user, with visibility conditions of the at least one object, said visibility conditions depending on the visibility score of the at least one object.

14. The method according to claim 13, wherein the visibility conditions further depend on predetermined parameters comprising a minimum duration of visibility of the at least one object or a surface area ratio between a surface area occupied by the object and the surface area of the dedicated image and/or an angle between the direction normal to the surface area occupied by the object and the normal direction of the display zone.

15. The method according to one of claim 13, comprising, after the step of determining compliance with the visibility conditions, a step comprising modifying the scene or a triggering an additional event inside or outside the scene.

16. The method according to claim 1, further comprising, when the visibility score of the at least one object is different from a predetermined visibility score, a step of modifying the object and reiterating the steps of computing the visibility score of the object modified.

\* \* \* \* \*